(12) United States Patent
Mori et al.

(10) Patent No.: US 7,521,650 B2
(45) Date of Patent: Apr. 21, 2009

(54) LASER MACHINING APPARATUS

(75) Inventors: Sadao Mori, Odawara (JP); Hiroyuki Sugawara, Tsuchiura (JP); Hiroshi Aoyama, Ebina (JP)

(73) Assignee: Hitachi Via Mechanics, Ltd., Ebina-shi (JP)

( * ) Notice: Subject to any disclaimer, the term of this patent is extended or adjusted under 35 U.S.C. 154(b) by 0 days.

(21) Appl. No.: 10/796,278

(22) Filed: Mar. 10, 2004

(65) Prior Publication Data
US 2005/0127051 A1 Jun. 16, 2005

(30) Foreign Application Priority Data
Mar. 14, 2003 (JP) ............... 2003-070256

(51) Int. Cl.
*B23K 26/067* (2006.01)
(52) U.S. Cl. ............... 219/121.67; 219/121.7; 219/121.73; 219/121.77; 359/496
(58) Field of Classification Search ............ 219/121.76, 219/121.77, 121.67–121.73; 250/578.1; 372/100; 359/618, 640, 496
See application file for complete search history.

(56) References Cited

U.S. PATENT DOCUMENTS

| | | | | |
|---|---|---|---|---|
| 4,787,747 A * | 11/1988 | Sommargren et al. | ...... | 356/487 |
| 4,974,919 A * | 12/1990 | Muraki et al. | ...... | 359/204 |
| 5,206,710 A * | 4/1993 | Geiler et al. | ...... | 356/432 |
| 5,453,814 A * | 9/1995 | Aiyer | ...... | 355/70 |
| 5,521,628 A | 5/1996 | Montgomery | | |
| 5,587,094 A * | 12/1996 | Yoshida et al. | ...... | 219/121.68 |
| 5,820,795 A * | 10/1998 | Takemori et al. | ...... | 264/1.36 |
| 5,822,211 A * | 10/1998 | Barenboim et al. | ...... | 700/166 |
| 5,825,043 A * | 10/1998 | Suwa | ...... | 250/548 |
| 6,018,418 A * | 1/2000 | Pan et al. | ...... | 359/495 |
| 6,130,403 A * | 10/2000 | Wakabayashi | ...... | 219/121.68 |
| 6,393,042 B1 * | 5/2002 | Tanaka | ...... | 372/101 |
| 6,650,480 B2 * | 11/2003 | Tanaka | ...... | 359/618 |
| 6,804,269 B2 * | 10/2004 | Lizotte et al. | ...... | 372/9 |
| 6,876,784 B2 * | 4/2005 | Nikolov et al. | ...... | 385/11 |
| 6,917,012 B2 * | 7/2005 | Perozek et al. | ...... | 219/121.73 |
| 6,943,086 B2 * | 9/2005 | Hongo et al. | ...... | 438/308 |
| 6,977,775 B2 * | 12/2005 | Sasaki et al. | ...... | 359/626 |
| 7,362,784 B2 * | 4/2008 | Yamazaki et al. | ...... | 372/29.014 |
| 2001/0016096 A1 * | 8/2001 | Feldman et al. | ...... | 385/17 |

(Continued)

FOREIGN PATENT DOCUMENTS

JP 58-33803 2/1983

(Continued)

*Primary Examiner*—Samuel M Heinrich
(74) *Attorney, Agent, or Firm*—Crowell & Moring LLP

(57) ABSTRACT

A laser machining apparatus in which three or more beam splits are made incident on one machining lens so that high speed machining can be achieved, and the machining quality (shapes, dimensions, accuracy and straightness of machined holes) is excellent. The optical paths of beams A and B having the same polarization direction are aligned almost in one and the same direction by a total reflection/transmission type beam combining means 31c using a difference in incident angle. After that, the optical paths of the beams A and B and the optical path of a beam C different in polarization direction therefrom are aligned almost in one and the same direction by a polarizing type beam combining means 32. Then, the beams A, B and C are made incident on a machining lens 45.

2 Claims, 2 Drawing Sheets

U.S. PATENT DOCUMENTS

2002/0153361 A1   10/2002  Sakamoto et al.
2002/0163730 A1*  11/2002  Sugiyama et al. ........... 359/618
2002/0196534 A1   12/2002  Lizotte et al.
2004/0264353 A1*  12/2004  Kitahara et al. ........ 369/112.23

FOREIGN PATENT DOCUMENTS

| JP | 11058055 A * | 3/1999 |
| JP | 11-314188 | 11/1999 |
| JP | 2000-190087 | 7/2000 |
| WO | WO00/53365 | 9/2000 |
| WO | WO00/64623 | 11/2000 |

* cited by examiner

LASER MACHINING APPARATUS

BACKGROUND OF THE INVENTION

The present invention relates to a laser machining apparatus for perforating or cutting using a laser beam. More particularly, this invention relates to a laser machining apparatus in which a laser beam emitted from a laser beam source is split into a plurality of beam splits different in optical path, and then the beam splits are made incident on one machining lens and condensed to machine different positions on a work concurrently.

For example, a laser beam emitted from a laser beam source is split into a plurality of beam splits different in optical path, and the beam splits are condensed by two-dimensional scanning optical systems and machining lenses prepared for the beam splits respectively, so as to machine holes in different positions of a printed circuit board mounted on an XY stage, as disclosed in Japanese Patent Laid-Open No. 58055/1999.

In this case, a region which can be scanned optically is limited. Therefore, first, the printed circuit board is positioned by the common XY stage so that a limited region is machined by optical scanning. After that, the XY stage is moved to machine the next region. Such an operation is repeated till machining is terminated.

However, this technique requires as many expensive machining lenses as the beam splits. In addition, since a region that can be scanned is limited, regions to be machined have to be allocated to be able to be perforated concurrently by the plurality of beam splits. In addition, it is difficult to allocate the regions to be machined in some machining patterns.

Therefore, in Japanese Patent Laid-Open No. 314188/1999 or Japanese Patent Laid-Open No. 2000-190087, two scanning optical systems are associated with one machining lens so that the machining speed is improved. In this case, it is not necessary to allocate regions to be machined. Thus, the workability can be improved.

However, the two optical scanning means cannot be placed in optimum positions with respect to the machining lens. Thus, there is a problem that machining beams are incident on the surface of the printed circuit board at an angle significantly shifted from the perpendicular to the surface of the printed circuit board so that the axes of the machined holes are inclined. Further, there is no reference to a method for making three or more beams incident on one machining lens so as to further improve the machining speed while reducing the price of the apparatus.

SUMMARY OF THE INVENTION

To solve the foregoing problems, an object of the present invention is to provide a laser machining apparatus in which three or more beam splits are made incident on one machining lens so that machining can be performed at a high speed, and the machining quality (shapes, dimensions, accuracy and straightness of machined holes) is excellent.

In order to attain the foregoing object, a laser machining apparatus according to the present invention includes a beam splitting means, a deflection means, a beam combining means, and a machining lens, the beam splitting means splitting a laser beam into a plurality of beam splits different in optical path, the beam combining means aligning the optical paths of the beam splits almost in one and the same direction so that the beam splits are incident on the machining lens. The beam combining means comprises a total reflection/transmission type beam combining means and a polarizing type beam combining means, and optical paths of two of the beam splits are aligned almost in one and the same direction by the total reflection/transmission type beam combining means, whereupon optical paths of the two beam splits and the other beam splits are aligned almost in one and the same direction by the polarizing type beam combining means.

Other objects, advantages and novel features of the present invention will become apparent from the following detailed description of the invention when considered in conjunction with the accompanying drawings.

DETAILED DESCRIPTION OF THE PREFERRED EMBODIMENT

First, description will be made on the total reflection/transmission type beam combining means. Incidentally, in this embodiment, three total reflection/transmission type beam combining means having the same structure are used.

Figure 2:
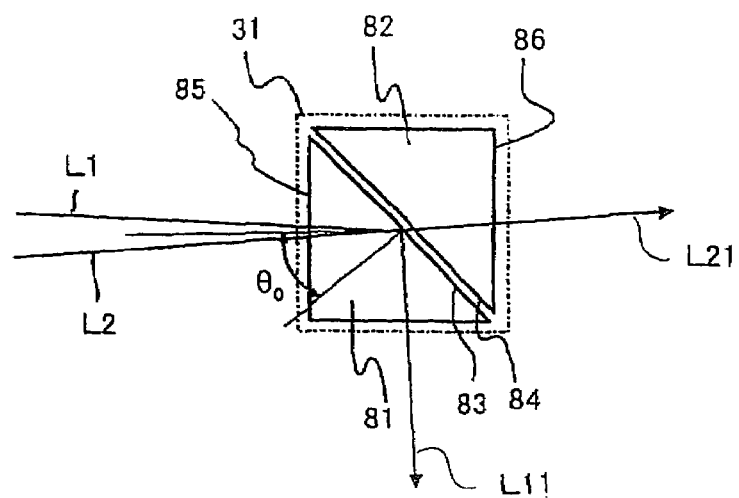
FIG. 2 is a configuration diagram of a total reflection/transmission type beam combining means according to the embodiment of the present invention.

As shown in FIG. 2, a total reflection/transmission type beam combining means 31 (31a-31c) comprises a triangular prism 81 and a triangular prism 82. The triangular prism 81 and the triangular prism 82 are disposed so that an inclined plane 83 and an inclined plane 84 are opposed to each other at a fixed distance. Antireflection coating is applied onto the inclined planes 83 and 84 and surfaces 85 and 86 through which beams will pass.

As shown in the same drawing, an incident beam L1 which is incident on the inclined plane 83 through the surface 85 at an incident angle larger than a critical angle $\theta_0$ determined by the refractive index of the prism is reflected by the inclined plane 83, so as to travel downward in the drawing as a reflected beam L11. On the contrary, an incident beam L2 which is incident on the inclined plane 83 through the surface 85 at an incident angle smaller than the critical angle $\theta_0$ penetrates the inclined planes 83 and 84 and the surface 86 and goes straight as a transmitted beam L21.

On the other hand, a beam traveling in the opposite direction in the optical path of the transmitted beam L21 and entering the surface 86 penetrates the triangular prism 81 and the triangular prism 82, and travels in reverse in the optical path of the incident beam L2, while a beam traveling in the opposite direction in the optical path of the reflected beam L11 and entering the surface 87 is reflected by the inclined plane 83, so as to travel in reverse in the optical path of the incident beam L1. Additionally, due to the reflection coating applied onto the inclined planes 83 and 84, the energy of a beam penetrating the inclined plane 83, 84 is substantially equal to the energy of a beam totally reflected by the inclined plane 83, 84.

In such a manner, the total reflection/transmission type beam combining means 31 can make beams coming in from one direction exit in two directions almost perpendicular to each other, and can make beams entering from two directions almost perpendicular to each other exit in one direction. The case where beams entering from one direction are made to exit in two directions almost perpendicular to each other by the beam combining means 31 will be referred to as "use in a separating type", while the case where beams entering from two directions almost perpendicular to each other are made to exit in one direction by the beam combining means 31 will be referred to as "use in a combining type".

Figure 1:
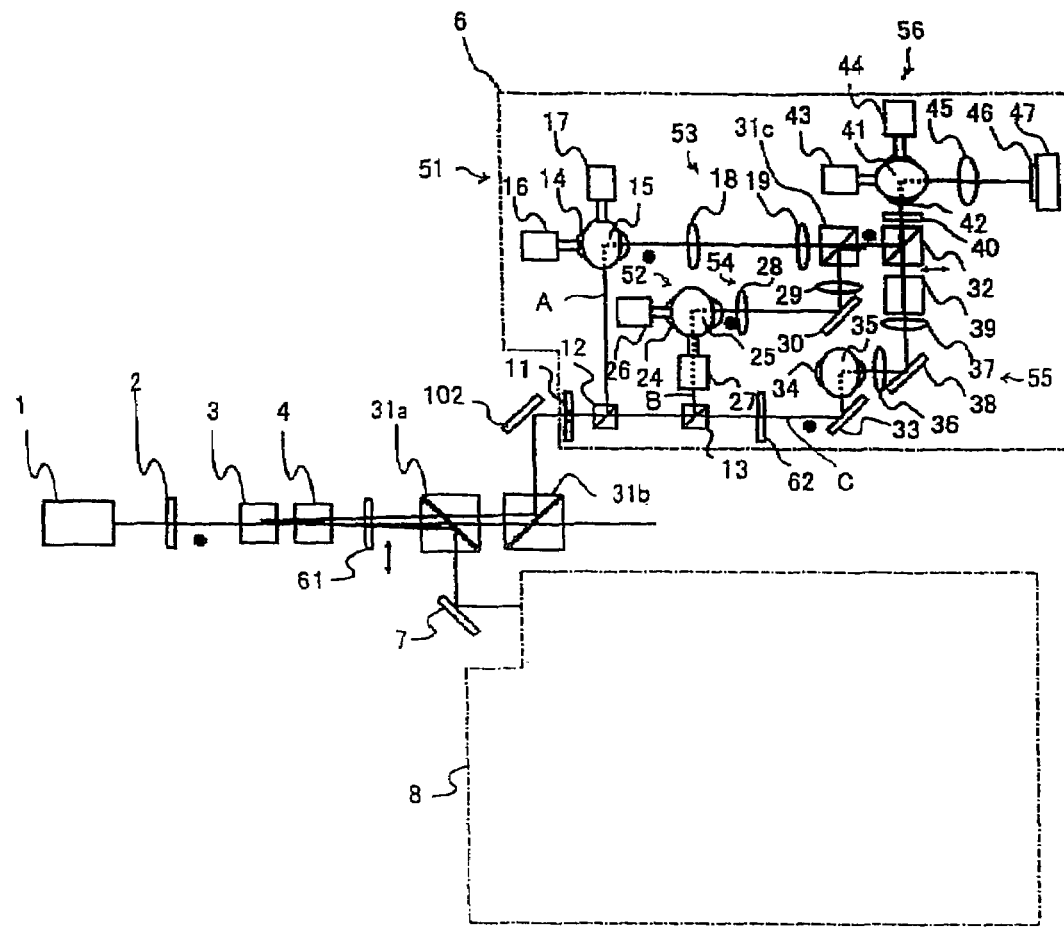
FIG. 1 is a configuration diagram of a laser machining apparatus according to an embodiment of the present invention.

Next, description will be made of constituent components of the laser machining apparatus according to the present invention with reference to FIG. 1.

A half-wave plate 2, acousto-optic deflectors (hereinafter referred to as "AOM") 3 and 4, a half-wave plate 61, beam combining means 31a and 31b and machining optical systems 6 and 8 are disposed on an optical path of a laser oscillator 1.

The laser oscillator 1 pulse-oscillates to generate a linearly polarized beam whose polarization plane (oscillating direction of the electric-field vector) is parallel to the paper surface. Each half-wave plate 2, 61 rotates the polarization plane of the incident laser beam at an angle of 90 degrees and sets the polarization plane of the outgoing laser beam to be perpendicular or parallel to the paper surface.

When the AOM 3 is ON, the AOM 3 deflects the incident beam having a polarization plane perpendicular to the paper surface to be upward in the paper surface at a very small angle. When the AOM 3 is OFF, the AOM 3 transmits the incident beam. When the AOM 4 is ON, the AOM 4 deflects the incident beam having a polarization plane perpendicular to the paper surface to be downward in the paper surface at a very small angle. When the AOM 4 is OFF, the AOM 4 transmits the incident beam.

The beam combining means 31a is used in a separating type. When the AOM 3 and the AOM 4 are OFF, the beam combining means 31a transmits the incident beam to the beam combining means 31b. When the AOM 3 is OFF and the AOM 4 is ON, the beam combining means 31a reflects the incident beam and guides it through a mirror 7 to the machining optical system 8 which will be described later.

The beam combining means 31b is used in a separating type, and installed in an opposite way with respect to the beam combining means 31a as illustrated. When the AOM 3 and the AOM 4 are OFF, the beam combining means 31b transmits the incident beam. When the AOM 3 is ON and the AOM 4 is OFF, the beam combining means 31b reflects the incident beam and guides the incident beam through a mirror 102 to the machining optical system 6.

Next, description will be made of the machining optical system 6.

An aperture 11, a beam splitting means (hereinafter referred to as "BS") 12, a BS 13, a half-wave plate 62, a mirror 33, a mirror 35, a mirror 34, a lens 36, a mirror 38, a lens 37, a dummy device 39, a polarizing beam splitter 32, a quarter-wave plate 40, a mirror 42, a mirror 41, a machining lens 45 and a machining object 46 are disposed on the optical path of a laser beam reflected by the mirror 102.

On the reflection side of the BS 12, a mirror 15, a mirror 14, a lens 18, a lens 19 and a beam combining means 31c are disposed.

On the reflection side of the BS 13, a mirror 25, a mirror 24, a lens 28, a mirror 30 and a lens 29 are disposed.

The aperture 11 shapes the laser beam to have an outer diameter whose size is suitable for machining. The BS 12 reflects and transmits the incident beam at a ratio of 1 to 2. The BS 13 reflects and transmits the incident beam at a ratio of 1 to 1. Accordingly, the reflected beam intensity of the BS 12 is equal to the reflected beam intensity and the transmitted beam intensity of the BS 13. That is, the laser beam passing through the aperture 11 is split into three beams having an equal intensity by the BS 12 and the BS 13. Hereinafter, the laser beam reflected by the BS 12 will be referred to as "beam A", the laser beam reflected by the BS 13 will be referred to as "beam B", and the laser beam transmitted by the BS 13 will be referred to as "beam C".

The mirror 14 disposed in the optical path of the beam A can be rotated at a desired angle around a transverse direction of the paper by a motor 16. On the other hand, the mirror 15 can be rotated at a desired angle around a longitudinal direction of the paper by a motor 17. The mirrors 14 and 15 and the motors 16 and 17 constitute a two-dimensional deflection means 51.

The lens 18 and the lens 19 have one and the same focal length. The lenses 18 and 19 are installed at a distance twice as long as the focal length from each other, so as to form a relay optical system 53. The relay optical system 53 is positioned so that the focal point outside the lens 18 coincides with the substantial center of the optical path connecting the mirror 14 and the mirror 15, and the focal point outside the lens 19 coincides with the substantial center of the optical path connecting the mirror 41 and the mirror 42. As a result, the two-dimensional deflection means 51 is imaged in the position of a two-dimensional deflection means 56 (near the position of the front focal point of the machining lens 45) by the relay optical system 53.

The beam combining means 31c is used in a combining type, and positioned to transmit the beam A incident from the left side of the drawing, and reflect the beam B incident from the lower side of the drawing to the right side of the drawing.

The mirror 25 disposed in the optical path of the beam B can be rotated at a desired angle around a longitudinal direction of the paper by a motor 27. On the other hand, the mirror 24 can be rotated at a desired angle around a transverse direction of the paper by a motor 26. The mirrors 25 and 24 and the motors 27 and 26 constitute a two-dimensional deflection means 52.

The lens 28 and the lens 29 have one and the same focal length. The lenses 28 and 29 are installed at a distance twice as long as the focal length from each other, so as to form a relay optical system 54. The relay optical system 54 is positioned so that the focal point outside the lens 28 coincides with the substantial center of the optical path connecting the mirror 24 and the mirror 25, and the focal point outside the lens 29 coincides with the substantial center of the optical path connecting the mirror 41 and the mirror 42. As a result, the two-dimensional deflection means 52 is imaged in the position of the two-dimensional deflection means 56 (that is, near the position of the front focal point of the machining lens 45) by the relay optical system 54.

The lens 36 and the lens 37 disposed in the optical path of the beam C have one and the same focal length. The lenses 36 and 37 are installed at a distance twice as long as the focal length from each other through the mirror 38, so as to form a relay optical system 55. The dummy device 39 is formed out of the same material as the beam combining means 31c and into one and the same shape as the beam combining means 31c. Incidentally, the relay optical system 55 and the dummy device 39 are provided for the main purpose of making the optical distance of the beam C between the aperture 11 and the machining lens 45, which will be described later, equal to the optical distance of each beam A, B likewise.

The polarizing beam splitter 32 transmits the beam C incident from the lower side of the drawing (a laser beam having a polarization plane parallel to the paper surface), and reflects the beam A, B incident from the left side of the drawing (a laser beam having a polarization plane perpendicular to the paper surface).

The quarter-wave plate 40 converts a linearly polarized beam into a circularly polarized beam.

The mirror 41 can be rotated at a desired angle around a transverse direction of the paper by a motor 43. On the other hand, the mirror 42 can be rotated at a desired angle around a longitudinal direction of the paper by a motor 44. The mirrors 41 and 42 and the motors 43 and 44 constitute a two-dimensional deflection means 56.

The machining object 46 is mounted on an XY stage 47.

Although the constituent components of the machining optical system 8 are not illustrated, the same constituent components as those of the machining optical system 6 are disposed symmetrically to the constituent components of the machining optical system 6.

Next, the operation of the optical system 6 will be described.

After having been subjected to two-dimensional deflection by the two-dimensional deflection means 51, the beam A is incident on the beam combining means 31*c* through the relay optical system 53. The beam A penetrates the beam combining means 31*c* and then enters the polarizing beam splitter 32.

In addition, after having been subjected to two-dimensional deflection by the two-dimensional deflection means 52, the beam B is incident on the beam combining means 31*c* through the relay optical system 54. The beam B is reflected by the beam combining means 31*c* and then enters the polarizing beam splitter 32.

That is, when the amount of deflection of the beam A is determined properly by the two-dimensional deflection means 51, the beam A is transmitted by the beam combining means 31*c*, and when the amount of deflection of the beam B is determined properly by the angle of the mirror 30 and the two-dimensional deflection means 52, the beam B is reflected totally. As a result, the optical paths of the beams A and B can be aligned (combined) almost in the same direction.

On the other hand, the beam C is incident on the polarizing beam splitter 32 through the half-wave plate 62, the mirror 33, the mirror 35, the mirror 34, the lens 36, the mirror 38, the lens 37 and the dummy device 39.

The oscillating planes of the beams A, B and C are rotated at an angle of 90 degrees respectively by the two-dimensional deflection means 51 (mirrors 15 and 14), the two-dimensional deflection means 52 (mirrors 25 and 24) and the mirrors 35 and 34 when they are deflected. Accordingly, the beams A and B are reflected by the polarizing beam splitter 32, while the beam C is transmitted by the polarizing beam splitter 32. As a result, the optical paths of the beams A, B and C can be aligned (combined) almost in one and the same direction.

After these beams are converted into circularly polarized beams by the quarter-wave plate 40, the beams are deflected by the two-dimensional deflection means 56 so as to enter the machining lens 45. Thus, desired three places of the machining object 46 can be machined concurrently.

Figure 3:
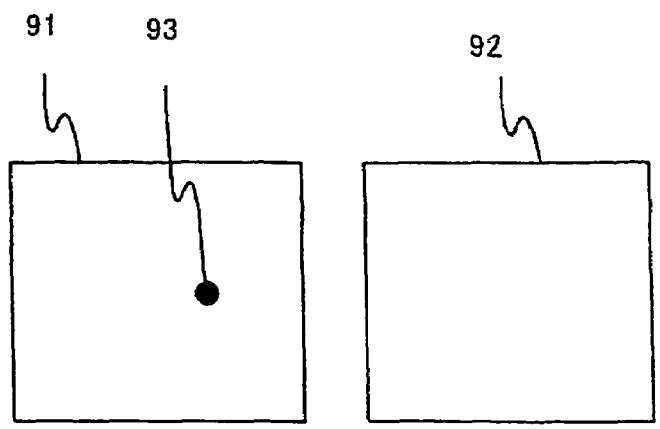
FIG. 3 is a diagram showing an example of disposition of regions to be machined according to the present invention.

Here, due to the operating principle of the beam combining means 31*c*, there is no case that the traveling direction of the beam A coincides with that of the beam B. On the other hand, the traveling direction of the beam C can be made to coincide with that of the beam A or B. Accordingly, as shown in FIG. 3, a region 93 to be machined by the beam C can be set to overlap a region 91 or 92 to be machined by the beam A or B.

In this embodiment, images of the two-dimensional deflection means 51 and 52 are formed near the front focal point of the machining lens 45 by the relay optical system 53 and 54 respectively. Thus, the beams A and B can be made incident substantially perpendicularly to the machining object 46. It is therefore possible to improve the straightness and shape accuracy of holes.

In addition, beam splits are combined using a difference in incident angle and polarization. Therefore, there occurs no energy loss in the beam splits.

In addition, circularly polarized beams are made incident on the machining lens 45. Accordingly, even when the machinability of the machining object 46 depends on the polarization direction, it is possible to improve the circularity of holes to be machined.

In addition, since the relay optical system 55 and the dummy device 39 are provided, the energy of the beam A, B is substantially equal to the energy of the beam C. Thus, the machining quality becomes uniform.

Further, since the AOMs 3 and 4 and the beam combining means 31*a* and 31*b* are provided, a laser beam outputted from the laser oscillator 1 can be time-divided and allocated to the machining optical systems 6 and 8. That is, for example, for perforating the machining object 46, perforating is first performed by the machining optical system 6 while the machining position of the machining optical system 8 is settled. Then, as soon as the machining by the machining optical system 6 is terminated, a laser beam is supplied to the machining optical system 8 and machining is started immediately. Then, while machining is performed by the machining optical system 8, the machining position of the machining optical system 6 is settled. Such an operation is repeated alternately so that the time to determine the machining positions of the beam splits can be kept to a minimum.

Figure 4:
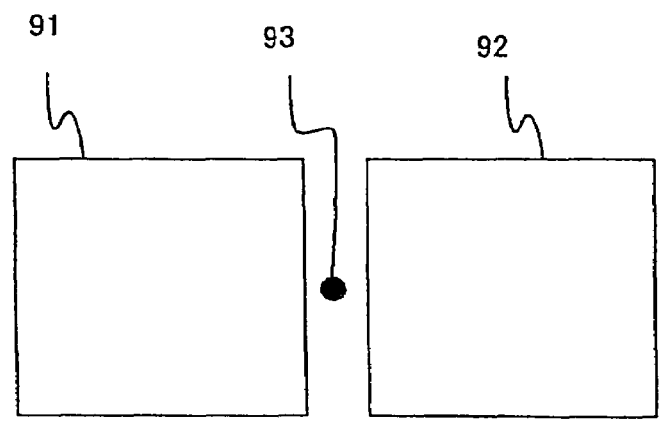
FIG. 4 is a diagram showing another example of disposition of regions to be machined according to the present invention.

Incidentally, in this embodiment, the region 91 to be machined by the beam A is set to overlap the region 93 to be machined by the beam C. However, in some machining patterns, as shown in FIG. 4, setting is done so that the region 93 to be machined by the beam 3 does not overlap any region 91, 92 to be machined by the beam A or B. Thus, the machining speed can be accelerated.

Figure 5:
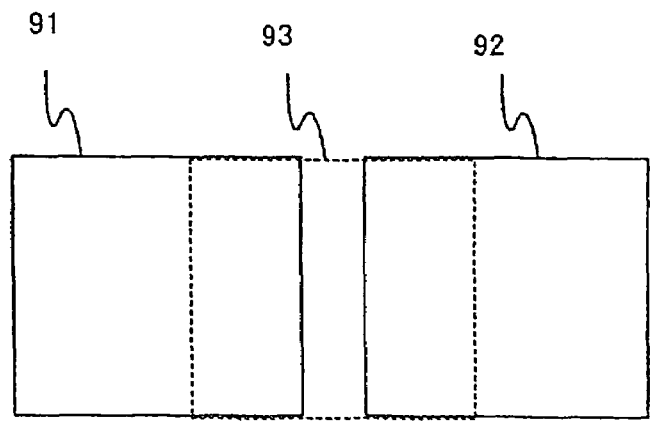
FIG. 5 is a diagram showing another example of disposition of regions to be machined according to the present invention.

In addition, although the mirrors 34 and 35 are fixed, they may be rotated respectively by motors to form a two-dimensional scanner. Thus, as shown in FIG. 5, setting can be done so that the region 93 to be machined by the beams C overlaps the regions 91 and 92 to be machined by the beams A and B. In such a manner, the overlapping area can be expanded so that high speed machining can be attained in various machining patterns.

Further, various combinations of the regions to be machined by the respective beams can be set in accordance with the properties of the total reflection/transmission type beam combining means 31 or the polarizing beam splitter 32 and the machining pattern.

In addition, although the beam passing through the aperture 11 is split into three by use of the BSs 12 and 13, the BSs 12 and 13 may be replaced by diffraction optical devices (HOEs or the like).

In addition, the half-wave plates 2, 61 and 62 can be replaced by optical rotators (devices for rotating polarization planes) such as Faraday devices or quartz optical rotators.

Incidentally, for perforating one or two holes in the region to be machined by the machining lens 45, for example, the mirrors of the two-dimensional deflection means 51 and 52 may be rotated largely so as to prevent any beam from being supplied to subsequent optical systems.

Further, according to the present invention, beams having the same polarization plane can be almost laid to overlap each other by use of the total reflection/transmission characteristic based on the incidental angles. Therefore, after the beam C is further split into two and micro-scanning is performed two-dimensionally with the two beam splits, the beam splits can be laid to overlap the beams A and B by the polarizing beam splitter 32. In such a manner, the four beams substantially laid to overlap one another can be made incident on the machining lens 45. Thus, four points can be machined concurrently.

As described above, according to the present invention, three or more laser beams can be made incident on one machining lens. Thus, the machining efficiency can be improved. In addition, each laser beam enters a work perpendicularly thereto by a relay optical system. Thus, the machining accuracy is improved.

The invention claimed is:

1. A laser machining apparatus, comprising: a beam splitting means, a deflection means, a beam combining means and a machining lens, said beam splitting means splitting a laser beam into three laser beam splits different in optical path, said beam combining means aligning said optical paths of said three laser beam splits in almost the same direction so that said three laser beam splits are incident on said machining lens:

wherein said beam combining means comprises:
 a total reflection/transmission type beam combining means; and
 a polarizing type beam combining means;

wherein said total reflection/transmission type beam combining means comprises a first triangular prism with a first inclined plane and a second triangular prism with a second inclined plane, wherein the first and second inclined planes face each other at a fixed distance, and wherein the optical paths of a first laser beam split and a second laser beam split incoming from two directions essentially perpendicular to each other are aligned in almost the same direction by said total reflection/transmission type beam combining means;

and wherein said polarizing type beam combining means aligns said aligned optical paths of said first and second laser beam splits, which have a same polarization state, with the third beam split, which has a different polarization state than the first and second laser beam splits and which is essentially perpendicular to the aligned first and second laser beam splits, in almost the same direction.

2. The laser machining apparatus according to claim 1, wherein said third beam split is split to form a fourth beam split and wherein said polarizing type beam combining means aligns said aligned optical paths of said first and second laser beam splits, which have the same polarization state, with the third beam split and the fourth beam split, which have the different polarization state than the first and second laser beam splits and which are essentially perpendicular to the aligned first and second laser beam splits, in almost the same direction.

* * * * *